Oct. 11, 1932.    C. H. POWELL    1,881,931
OVERDRIVE TRANSMISSION
Filed June 22, 1931
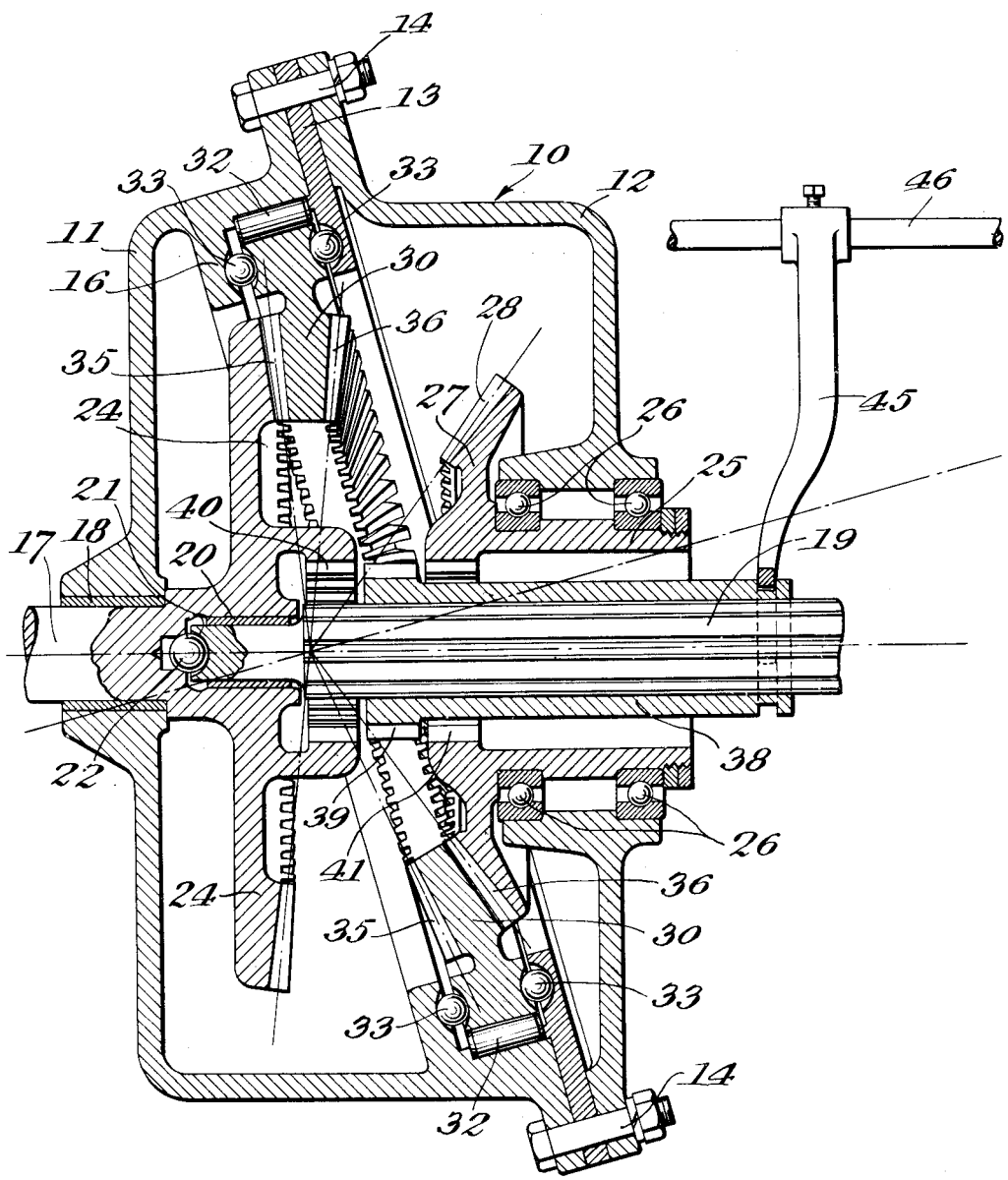
Inventor:
Clarence H. Powell
By Macleod, Calver, Copeland + Dike
Attorneys.

Patented Oct. 11, 1932

1,881,931

UNITED STATES PATENT OFFICE

CLARENCE H. POWELL, OF DETROIT, MICHIGAN, ASSIGNOR TO HUDSON MOTOR CAR COMPANY, OF DETROIT, MICHIGAN, A CORPORATION OF MICHIGAN

OVERDRIVE TRANSMISSION

Application filed June 22, 1931. Serial No. 545,862.

This invention relates to automobile transmissions and more particularly to a gear arrangement of the so-called overdrive type.

While the desirability of an effective overdrive transmission has been generally recognized and while several attempts have been made to perfect such a device, those which have heretofore been suggested are unsatisfactory because of the noise incident to their use. Moreover, it has been common, heretofore, to employ a complicated internal gear overdrive construction which was difficult and expensive to manufacture.

It is an object of the invention to provide a quiet overdrive construction of low cost.

Another object of the invention is the provision of an overdrive construction in which the objectionable internal gearing is eliminated.

Other objects of the invention will appear from the reading of the following description taken in conjunction with the accompanying drawing in which the single figure is a sectional elevational view of an overdrive transmission embodying the invention.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The embodiment of the invention illustrated in the accompanying drawing comprises a casing 10, preferably, of two parts 11 and 12 between which an annular plate 13 is positioned so as to project inwardly from the interior surface of the casing. The parts 11 and 12 of the casing, together with the annular plate 13 are secured together as by bolts 14. An annular projection 16 extends inwardly from the interior surface of the casing and is spaced from the plate 13. A drive shaft 17 extends into the casing 10 and is rotatably supported therein in a suitable bearing 18. A driven shaft 19 extends into the casing 10 in alinement with the drive shaft 17 and its free end is rotatably supported in a bearing 20 in a counterbore 21 in the end of the shaft 17. A ball bearing 22 is positioned between the bottom of the counterbore and and the end of the driven shaft 19. A bevel wheel, such as a gear 24, preferably, having helical teeth is fixed upon the shaft 17.

A sleeve 25 surrounds the shaft 19 and is mounted for rotation in suitable bearings 26 in the casing 10 and is provided at its inner end with a gear ring 27 surrounding the shaft 19. The gear ring 27 is provided with a bevel gear 28, preferably, having helical teeth. A gear ring 30 is angularly disposed with respect to the alined shafts 17 and 19 and is mounted for rotation in roller bearings 32 in the casing 10 between the plate 13 and the annular projection 16. Thrust bearings 33 are positioned between the gear ring 30 and the projection 16 and plate 13. The gear ring 30 is provided with bevel gears 35 and 36, preferably, having helical teeth, adapted to engage the bevel gears 24 and 28 respectively. Preferably, the apices of the pitch cones of the bevel gears 24, 28, 35 and 36 are coincidental. A clutch member 38 is slidably keyed upon the shaft 19 and is provided with a dog 39 adapted to engage a dog 40 on the gear 24 or a dog 41 on the gear ring 27. A clutch finger 45 is suitably secured at one end to the clutch 38 and at its other end upon a rod 46 slidably mounted in suitable bearings (not shown).

By sliding the clutch member 38, the driven shaft 19 may be connected directly with the drive shaft 17 or indirectly through the gears 24, 28, 35 and 36. The invention provides an extremely quiet low cost overdrive construction and avoids the use of internal gearing. In order to simplify the illustration, the usual gears of the transmission which furnish the reverse and intermediate speeds have been omitted.

I claim:

1. In a transmission, drive and driven shafts, two pairs of bevel gears, the gears of one of said pairs being operatively connected at all times and adapted to connect the gears of the other pair, one of the gears of said other pair being connected to one of said shafts, and means adapted to connect said shafts either directly or through said gears.

2. In a transmission, aligned shafts, a pair of bevel gears one of which is connected with one of said shafts, a gear ring rotatably mounted between said pair of gears and surrounding the axis of said shafts, said gear ring having gears connecting said pair of gears, and means adapted to connect said shafts either directly or through said gears.

3. In a transmission, aligned drive and driven shafts, a pair of bevel gears having helical teeth, one of said gears being connected with one of said shafts, a gear ring rotatably mounted between said pair of gears and surrounding the axis of said shafts, said gear ring having gears connecting said pair of gears and means adapted to connect said shafts either directly or through said gears.

In testimony whereof I affix my signature.

CLARENCE H. POWELL.